United States Patent [19]
Williams

[11] 4,120,116
[45] Oct. 17, 1978

[54] OPTICAL TOY

[76] Inventor: Guy Williams, 11816 Goshen Ave., Los Angeles, Calif. 90049

[21] Appl. No.: 763,724

[22] Filed: Jan. 31, 1977

[51] Int. Cl.² .................... A63H 33/00; G02B 27/08
[52] U.S. Cl. ...................................... 46/1 R; 350/4.2
[58] Field of Search ................ 46/1 R, 43; 350/4, 5

[56] References Cited
U.S. PATENT DOCUMENTS

| | | | |
|---|---|---|---|
| 2,452,363 | 10/1948 | Flotron | 350/4 |
| 3,237,512 | 3/1966 | Beverett | 350/4 |
| 3,242,799 | 3/1966 | Beverett | 350/5 |
| 3,930,711 | 1/1976 | Powell | 350/4 |

*Primary Examiner*—Louis G. Mancene
*Assistant Examiner*—Mickey Yu
*Attorney, Agent, or Firm*—Lyon & Lyon

[57] ABSTRACT

Described herein is a novel optical toy of the kaleidoscope type. The article is comprised of a cylindrical tube having a mirrored inner surface. This tube contains a transparent sphere which is gravitationally rollable through the interior of the tube. The sphere is retained within the tube by means of a ring positioned about each end of the tube. The ring has an inner diameter slightly smaller than the diameter of the sphere thereby preventing the sphere from passing from the tube. Positioned on the outer end of the tube is a prism or other suitable article useful in refracting light. This may be spaced a short distance from the outer end of the tube by means of a clear tubular attachment and it breaks up white light into its various components and reflects the different color light into the tube where it is reflected off the mirrored inner surface and passes through the transparent sphere producing various eye-pleasing color designs on the mirrored inner surface.

10 Claims, 4 Drawing Figures

U.S. Patent
Oct. 17, 1978
4,120,116
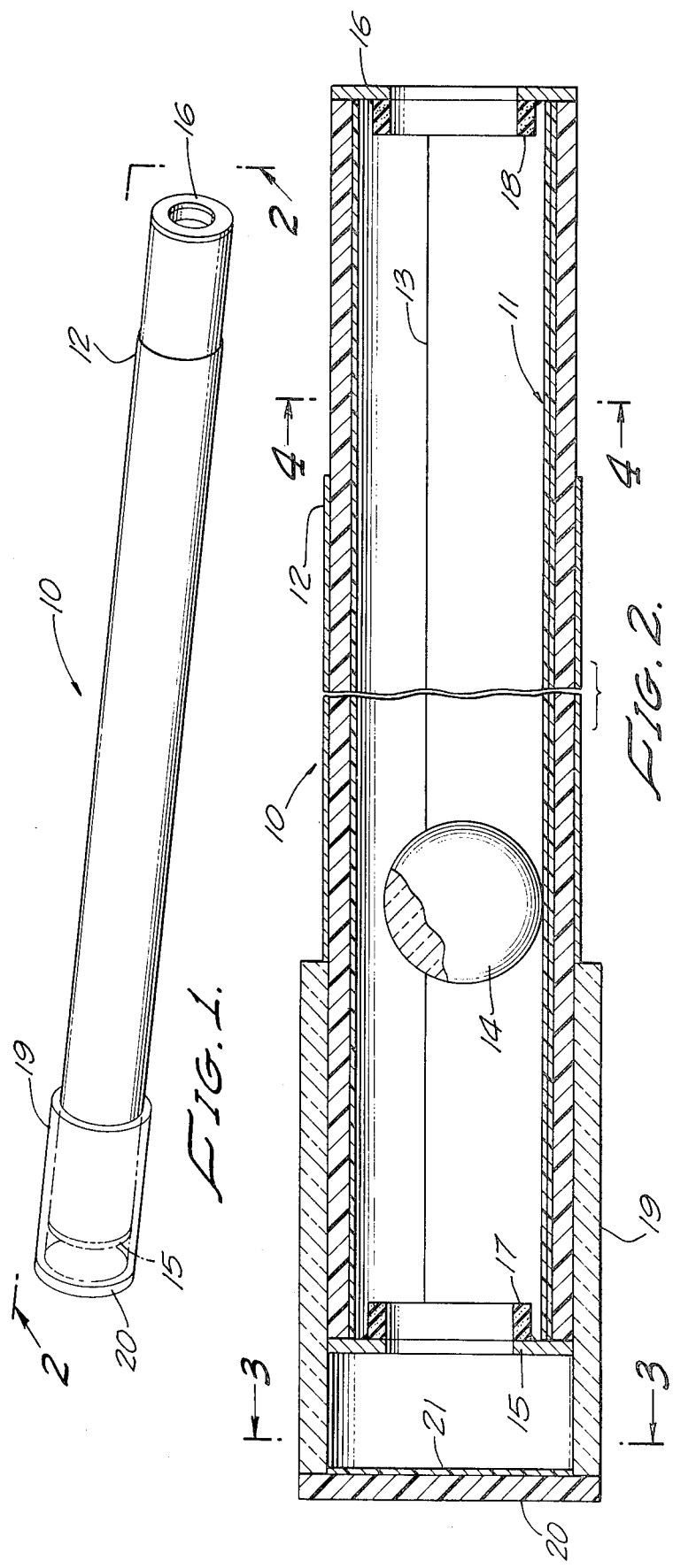
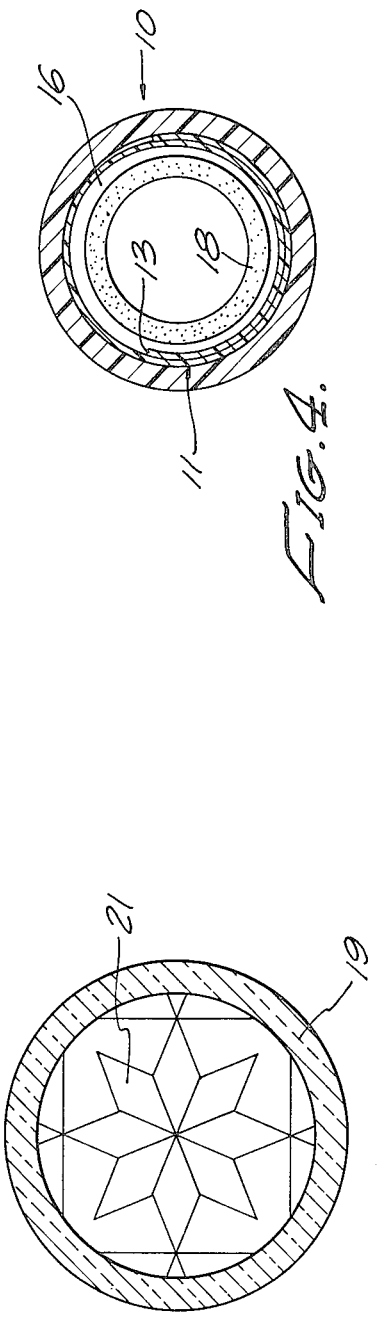

OPTICAL TOY

BACKGROUND OF THE INVENTION

Nearly every child has enjoyed the optical designs created by a kaleidoscope. These devices ordinarily contain loose bits of colored glass or plastic between two flat transparent plates. Two planes mirrors are positioned so that changes in the configuration of the glass particles are reflected in endless procession of variegated designs.

Various examples of kaleidoscopes are present in the prior art. For example, in Dougall, U.S. Pat. No. 984,198, the patentee teaches the use of a tube having a cross-section in the form of a polygon with three or more sides. Each side of the polygon has a mirrored surface and the design imparted to the viewer by the kaleidoscope is produced by means of bits of colored paper arranged on discs placed over the outer end of the tube. The end of the tube being furthest away from the eye being denominated the outer end of the tube. These discs are held in place by means of a detachable plate holder consisting of a strip of spring metal having clamping jaws attached to the outer end of the tube.

A similar kaleidoscope may be found in Lovibond, U.S. Pat. No. 407,937. Here the patentee substitutes for the irregularly-shaped multi-colored pieces of glass, ordinarily employed, discs that are independently movable by a rolling motion. Thus designs of great variety are formed and are capable of being reproduced and repeated at will.

Both prior art articles exhibit the traditional kaleidoscope, i.e., the changeability of the design is due to the rotation or the shifting of plates on the outer end of the device. More recent articles have, to some extent, abandoned the simplistic designs of the past and incorporated a sphere which travels the length of the tube. An example of this type device may be found in Flotron, U.S. Pat. No. 2,452,363. Flotron discloses the use of a tubular body having a plurality of internally reflective planar surfaces. Once the tube has been assembled, designs are formed when it is held a slight distance away from an ornamental pictorial surface thus producing a plurality of images. The glass marble is held within the tube and is permitted to rotate in any direction. This rotation provides a quasi-kaleidoscopic effect which may be varied by careful selection of the target material. Beverett, U.S. Pat. No. 3,237,512, incorporates into his kaleidoscope, a tube in which the mirrored sections have a trapezoidal shape so that the ball is held suspended above the base by two sides of the trapezoid. The ball spins rapidly as it slowly traverses the length of the device, thus it appears to the viewer that the ball is suspended in mid-air within the toy.

The common denominator of each of these prior art patents is utilization of an inner mirrored surface polygonic in shape be it either three, four or more sides. One patent incorporating a circular tubular kaleidoscope is Beverett, U.S. Pat. No. 3,242,799. Here, however, the reflected patterns emanate from spinning circumrotating marbles instead of from loose or disembedded fragments. The marbles do not traverse the length of the kaleidoscope. An additional kaleidoscopic device is disclosed in Powers, U.S. Pat. No. 3,383,150.

BRIEF SUMMARY OF THE INVENTION

According to this invention there is provided a novel assembly useful as an optical toy. The assembly refracts light into its component colors thereby producing a visual effect pleasing to the eye. The assembly comprises a circular tubular member having a mirrored inner surface. A transparent sphere resides within the tubular member and may gravitationally travel its length. Over the outer end of the tube is positioned a prismatic refraction means which refracts and disperses incoming light rays into a spectrum of color producing a kaleidoscopic effect.

The manner in which the objects and advantages of the invention are achieved will become clear from the description of preferred embodiments which follows and from the accompanying drawing in which:

FIG. 1 is a side perspective view of the article of this invention as assembled.

FIG. 2 is a partial cutaway view of the article along axis 2—2 of FIG. 1.

FIG. 3 is a prismatic refraction means as viewed along axis 3—3 of FIG. 2.

FIG. 4 is a cutaway view of the inner end of the article along axis 4—4 of FIG. 2.

DETAILED DESCRIPTION OF THE INVENTION

With reference to FIGS. 1 and 2, the articles of this invention is comprised of a circular tubular member 10 having a mirrored inner surface 11. This inner surface may be mirrored glass, metallized Mylar or any other light reflecting substance. When a sheet of metallized Mylar is used it is rolled into a circular tubular shape and inserted into the circular tubular member 10. When using a sheet of Mylar or other similar substance where the surfaces of the sheet overlap there will appear a line 13. The presence of this line will contribute to the optical effects produced by the article but its presence is not necessary. Naturally, the article will function equally as well when the mirrored inner surface is continuous.

Residing within the tubular member 10 is a transparent sphere 14. This sphere may be clear or colored and it is free to travel the length of tubular member 10. Transparent sphere 14 is retained within tubular member 10 by a pair of retaining means 15 and 16, one at each end. In a preferred embodiment the retaining means are in the form of rings where the inner diameter is slightly less than the diameter of transparent sphere 14. The inner diameter of the rings, being open, forms the eyepiece of the article. The viewer raises the article to the eye and gravity imparts a rolling motion to the transparent sphere 14. This motion of the sphere creates a design in the article that is pleasing to the eye.

In order to protect the viewer from possible eye damage by the motion of the transparent sphere 14 there is positioned about the inner surfaces of the retaining means 15 and 16, a cushioning means 17 and 18. These cushioning means, usually rubber rings, soften the impact of the transparent sphere and prevent the surface of the sphere from extending past the tubular member thus preventing damage to the viewer's eye.

The optical qualities of the article are improved when a prismatic refraction means is positioned about the outer end of the tubular member 10 (outer end denoting that part of the article furthest away from the viewer). A preferred embodiment of the prismatic refraction means attached to the tubular member is shown in FIG. 2. Transparent sleeve 19 is placed about the outer end of tubular member 10. Transparent sleeve 19 is kept in proper position by extended portion 12 of the surface of tubular member 10. On sleeve 19 may be attached an opaque end portion 20 having on its inner surface a prismatic refraction means 21. Light coming over the viewer's shoulder hits prismatic refraction means 21 and is refracted and dispersed into the various colored components of the spectrum. This light is reflected into tubular member 10 imparting a kaleidoscopic effect to the eye.

The prismatic refraction means shown in FIG. 3 is a sheet of metallized Mylar 21 upon whose surface has been inscribed a geometric design. Although the design shown in FIG. 3 is star-shaped other geometric designs may be used with this invention. Each design acts as a different prism thus permitting numerous eye-pleasing color combinations. Also, virtually any type prismatic refraction means may be used in place of that shown in FIG. 2 even an ordinary prism. If a variety of prismatic refraction means are available, they may be designed so they are interchangeable at the outer end of the tubular member 21 thereby increasing the number of potential designs available to the viewer.

FIG. 4 shows the inner end of the article as viewed along 4—4 of FIG. 2. Tubular member 10 has an inner surface mirrored sheet 11 which has a circular tubular shape, the ends of the sheet overlapping at 13. Ring 16 is shown with cushion 18 about its inner surface.

While my invention has been described by reference to preferred embodiments thereof, it will be understood that the invention is not limited thereto, but only to the lawful scope of the appended claims.

I claim:

1. A toy comprising a circular tubular member with a mirrored inner surface, said tubular member containing a transparent sphere rollable through the interior of said tubular member, said tubular member having a retaining means on each end for preventing said sphere from passing from said tubular member, said retaining means forming an eyepiece to permit viewing and having a prismatic refraction means positioned over the outer end of said tubular member.

2. A toy according to claim 1 wherein said inner surface is mirrored glass.

3. A toy according to claim 1 wherein said mirrored inner surface is metallized Mylar.

4. A toy according to claim 1 wherein said retaining means have a cushioning means about their inner surface for softening the impact of said sphere against said retaining means.

5. A toy according to claim 1 wherein said sphere is prevented from passing from said tubular member by means of a ring positioned about each end of said tubular member, said ring having an inner diameter slightly smaller than the diameter of said sphere.

6. A toy according to claim 5 wherein said rings have a cushioning means about their inner surface for softening the impact of said sphere against said rings.

7. A toy comprising a cylindrical tubular member having a mirrored inner surface, said tubular member containing a transparent sphere rollable through the interior of said tubular member, said tubular member having a ring positioned about each end for preventing said sphere from passing from said tubular member, said ring having an inner diameter slightly smaller than the diameter of said sphere, said ring forming an eyepiece to permit viewing, said tubular member having an interchangeable clear tubular attachment about the outer end, said attachment extending for a short distance past the outer end of said tubular member, said attachment having a prismatic refraction means on the inner surface of the terminus of the attachment.

8. A toy according to claim 7 wherein said inner surface is mirrored glass.

9. A toy according to claim 7 wherein said mirrored inner surface is metallized Mylar.

10. A toy according to claim 7 wherein said rings have a cushioning means about their inner surface for softening the impact of said sphere against said rings.

* * * * *